:# 3,549,630
METHOD OF PREPARING ISOCYANURIC ACIDS AND THEIR SALTS

Perry A. Argabright, Littleton, Charles H. De Puy, Boulder, and Brian L. Phillips, Littleton, Colo., assignors to Marathon Oil Company, Findlay, Ohio, a corporation of Ohio
No Drawing. Filed Nov. 13, 1967, Ser. No. 682,576
Int. Cl. C07d 55/38
U.S. Cl. 260—248                8 Claims

ABSTRACT OF THE DISCLOSURE

Method of preparing isocyanuric acids, particularly 1,3-disubstituted isocyanuric acids, and salts thereof, which involves forming a reaction mixture of an organic isocyanate and a metal cyanate, reacting the isocyanate with the metal cyanate in the presence of an aprotic solvent at a temperature and for a time sufficient to effect formation of a metal salt of a 1,3-disubstituted isocyanuric acid, and converting the metal salt to the desired 1,3-disubstituted isocyanuric acid. The reaction between the organic isocyanate and the metal cyanate advantageously is carried out at temperatures of from about 0° C. to about 250° C. The products may be used for intermediates in the production of pharmaceuticals, insecticides, disinfectants, and in the preparation of polymers.

---

The products of this invention may be used for many different functions, some of which are intermediates in the production of pharmaceuticals, insecticides, disinfectants, and in the preparation of polymers. For instance, products of the structural formula:

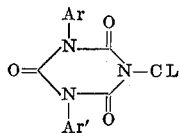

wherein Ar and Ar' can be the same and are aryl or noninterfering substituted derivatives thereof, which are disubstituted chloroisocyanurates, can be used effectively as disinfectants. As another example, an intermediate of the structural formula:

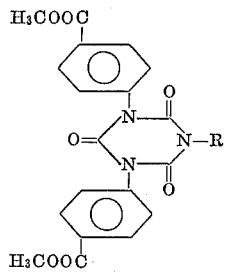

wherein R is an aryl, alkyl, or aralkyl group, is used in the preparation of polymers with excellent inherent UV absorbence. The above compound is synthesized in accordance with the present invention by first preparing the metallic bis(p-carbomethoxyphenyl) isocyanurate followed by reaction with a suitable organic halide, i.e. benzyl chloride.

Products made in accordance with this invention generally have the excellent properties of thermal stability. These examples are only a sampling of the vast scope of uses for the products made by the process of this invention.

Various methods heretofore have been employed to prepare disubstituted isocyanuric acids. These prior methods, in the main, however, have been found to be unsatisfactory for any of a number of reasons chief among which are the tendency for interfering side reactions to take place and/or the formation of by-products which make separation and isolation of the desired disubstituted isocyanuric acid difficult. These factors, of course, materially adversely affect yields of the acids.

The method of the present invention substantially overcomes the aforementioned disadvantages of prior methods of preparing disubstituted isocyanuric acids, and enables such acids, especially 1,3-disubstituted forms thereof, to be obtained in commercially significant yields under conditions which favor easy separation and purification of the desired end products. The starting materials employed in the method are readily available and comparatively inexpensive, and the formation of the acids is carried out under conditions which do not require the use of specialized equipment.

In brief, the method of this invention involves forming a metal salt of a 1,3-disubstituted isocyanuric acid by reacting an organic isocyanate with a metal cyanate in the presence of an aprotic solvent and converting the metal salt to the corresponding 1,3-disubstituted isocyanuric acid. The reaction to produce the metal salt may be represented by the following equation:

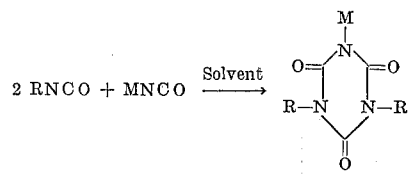

wherein R may be a substituted or unsubstituted aliphatic radical, or a substituted or unsubstituted aromatic radical, and M is an alkali or alkaline earth metal. Mixtures of different RNCO compounds may be employed so as to obtain products containing different substituents.

The proportions of organic isocyanate and metal cyanate employed in carrying out the reaction to form the metal salts of 1,3-disubstituted isocyanuric acids in accordance with the practice of this invention are somewhat variable. The generally optimum objectives of the invention, however, are most advantageously achieved with approximately stoichiometric or theoretical proportions of the reactants, that is, an organic isocyanate to metal cyanate ratio of about 2:1.

The organic isocyanates utilized in carrying out the method can be selected from a wide group. As indicated hereinabove, they include both substituted and unsubstituted aliphatic and aromatic isocyanates. In those instances where a substituted aliphatic or aromatic isocyanate is employed, the substituents should be of a type which do not interfere to any appreciable extent with the cotrimerization reaction between the isocyanate and the metal cyanate. Exemplary of organic isocyanates which can be used in the method of this invention are alkyl isocyanates such as methyl isocyanate, ethyl isocyanate, propyl isocyanate, isopropyl isocyanate, butyl isocyanate, isobutyl isocyanate, amyl isocyanate, isoamyl isocyanate, cyclopentyl isocyanate, octyl isocyanate, isooctyl isocyanate, dodecyl isocyanate, tetradecyl isocyanate, hexadecyl isocyanate, octadecyl isocyanate, and the like; and aromatic isocyanates including aryl and aralkyl isocyanates exemplified by phenyl isocyanate, tolyl isocyanate, xylyl isocyanate, p-nitrophenyl isocyanate, p-chlorophenyl isocyanate, p-methoxyphenyl isocyanate, p-ethoxyphenyl isocyanate, naphthyl isocyanate, 4-nitronaphthyl isocyanate, benzyl isocyanate, p-nitrobenzyl isocyanate, m-nitrobenzyl isocyanate, p-methoxy benzyl isocyanate, p-ethoxybenzyl isocyanate, p-chlorobenzyl isocyanate, naphthobenzyl isocyanate, 4-nitronaphthobenzyl isocyanate, 4-methoxynaphthobenzyl isocyanate, and the like. Of the numerous alkyl isocyanates which can be used, the primary and secondary alkyl isocyanates are preferred.

The metal cyanates employed in carrying out the method of this invention comprise alkali and alkaline earth metal cyanates. Exemplary thereof are sodium cyanate, potassium cyanate, lithium cyanate, rubidium cyanate, cesium cyanate, calcium cyanate, barium cyanate, strontium cyanate, magnesium cyanate and beryllium cyanate. The most preferred metal cyanate is potassium cyanate.

As indicated, the reaction between organic isocyanate, and the metal cyanate to form the metal salt of the desired disubstituted isocyanuric acid is carried out in the presence of an aprotic solvent. The aprotic solvents having utility in this connection are characterized in that (1) they are liquid under the conditions of the reaction; (2) they have a high dielectric constant, i.e. greater than about 15 at 25° C.; (3) they preferably are dipolar, that is, one part of the molecule has a more positive electrical charge relative to the other parts of the molecule thereby causing the molecule to act as a dipole; (4) they are sufficiently inert not to enter into deleterious side reactions to any appreciable extent under the conditions of the reaction; and (5) they do not possess hydrogen atoms capable of hydrogen bonding with or transferring to anions in solution in the reaction mixture. A mixture of solvents satisfying the foregoing criteria can, of course, be employed. Exemplary of solvents useful in carrying out the method are alkyl pyrrolidones such as N-methylpyrrolidone-2 and N-ethylpyrrolidone-2; sulfoxides exemplified by dimethylsulfoxide, and diethylsulfoxide; alkyl amides including N, N-dimethylformamide, N, N-diethylformamide, N, N-dimethylacetamide and N,N-diethylacetamide; alkylphosphoramides and arylphosphoramides such as hexamethylphosphoramide, hexaethylphosphoramide, and hexaphenylphosphoramide; nitriles examples of which are acetonitrile and benzonitrile; alkylureas such as tetramethylurea and tetraethylurea; and the like; and compatible mixtures thereof.

The quantity of solvent used is variable. From a practical standpoint, only so much of the solvent need be employed as is required to facilitate both maintenance of the desired temperature conditions and work up of the end product or products. Generally speaking, the quantity of solvent used will range from about 0.5 to about 20, usually about 1 to about 5, liters per mole of organic isocyanate employed.

The temperatures utilized in forming the metal salts of disubstituted isocyanuric acids by the method of this invention will depend, in large measure, upon the reactivity of the organic isocyanate used. Thus, for example, with reactive isocyanates such as benzylisocyanate, the reaction with the metal isocyanate is exothermic and, therefore, cooling of the reaction mixture may be required. With a less reactive isocyanate such as n-octyl isocyanate, on the other hand, the reaction mixture will require heat to effect formation of the desired metal salt within reasonable time periods. Generally speaking, the temperatures employed in carrying out the method of the present invention will range from about 0° C. to about 250° C. usually about 5° C. to about 100° C., with temperatures in the range of from 10° C. to about 75° C. produce optimum results in most cases.

The utilization of pressure in carrying out the method is desirable in those instances where either the solvent or the organic isocyanate is gaseous at the operable reaction temperature. To this end, pressures of the order of from about 1 to 30, usually about 5 to about 10, atmospheres are sufficient.

Conversion of the metal salts of the disubstituted isocyanuric acids advantageously is attained by contacting them, for example, with a dilute solution of a suitable acid. Displacement of the metal substituent of the salts desirably is achieved after the solvent, any unreacted metal cyanate, and tri-substituted isocyanurate have been removed from the reaction mixture.

While a wide variety of agents can be employed to effect conversion of the metal salts to the desired disubstituted isocyanuric acids, from a practical standpoint it is preferred to use a dilute aqueous solution of an inorganic acid such as hydrochloric acid. Aqueous solutions of the acid suitable for the purposes of the present invention may range in strength from about 1% to about 20%, more or less.

Mixed or symmetrically trisubstituted isocyanurates may be formed by conversion of the metal salts of the disubstituted isocyanuric acids by contacting said metal salts with an organic halide of the form RX, said metal salts with an organic halide of the form RX, where R is preferably a substituted or unsubstituted aliphatic or aralkyl radical and X is any of the Group VII elements of the Periodic Table, but is preferably chlorine. The organic halides can be characterized in that they have a halogen substituent which is terminal or in a position such that displacement thereof will not be hindered by steric or other factors, or as in the case of aromatic halides, the halogen substituent is not attached directly to the aromatic ring but to a substituent on the ring. If one desires the symmetrically trisubstituted isocyanurate, R must be the same as that used in the initial reaction producing the disubstituted metal salt, otherwise the product will be the mixed trisubstituted isocyanurate salt.

In order that the full details of the present invention will be even better understood, the following examples are provided. These examples are illustrative of the practice of the method of the invention and it should be understood that variations may be made therein in a number of particulars without in any way departing from the fundamental principles and teachings provided herein. The examples, therefore, are not to be construed in any way as limitative of the scope of the invention.

EXAMPLE I

To a slurry (good string) of 10.5 g. (0.16 mole) sodium cyanate in 200 ml. of anhydrous dimethylformamide (DMF) is added a solution of 35.7 g. (0.30 mole) phenyl isocyanate in 100 ml. DMF. The isocyanate is added dropwise under a nitrogen atmosphere. Approximately 50 minutes is required to complete the addition, and during this period the temperature of the reaction mixture rises from 25° to 37° C. After stirring at ambient temperature for an additional one hour, the DMF insolubles are allowed to settle, and the DMF phase is decanted and distilled off in vacuo to near dryness. The residue is stirred well with 300 ml. of distilled water forming a suspension of a white insoluble material which is filtered off and dried to yield 16.65 g. This material is identified as a mixture containing triphenyl isocyanate (I) and 1,3-diphenylurea by comparison of its infrared spectrum with the spectra of the pure components. Analysis via the integrated nuclear magnetic resonance (N.M.R.) spectrum indicates the mixture contains 75.7 weight percent triphenyl isocyanurate, 8.5 weight percent 1,3-diphenylurea, and 15.8 weight percent DMF. The aqueous filtrate is acidified by a dropwise addition of concentrated HCl and the resulting precipitate is collected and dried to give 25.19 g. The N.M.R. spectrum indicates this product is 93.3% diphenyl isocyanurate and 6.7% DMF. One crystallization from ethanol gives a crystalline material, M.P. 262.5–263.5° C. The infrared spectrum, N.M.R. spectrum, elemental analysis, and neutral equivalent confirm that this product is diphenyl isocyanurate (II). Using the analyses obtained by N.M.R. the following can be calculated from the weights of the isolated products.

Conversion of $\phi$NCO $$= \frac{\text{total moles } \phi\text{NCO converted to I and II}}{\text{moles } \phi\text{NCO charged}}$$

$$\times 100 = 91.0\%$$

Selectivity to II $$= \frac{\text{moles } \phi\text{NCO converted to II}}{\text{total moles } \phi\text{NCO converted}} \times 100 = 61.2\%$$

EXAMPLES II–V

Example I is repeated maintaining the indicated temperature throughout the reaction period.

| Example No.: | Reaction temp., °C. | Mole percent conversion of $\phi$NCO | Percent selectivity to II based on $\phi$NCO |
|---|---|---|---|
| II | 6–8 | 85.0 | 52.4 |
| III | 20 | 91.0 | 61.0 |
| IV | 75 | 91.7 | 83.0 |
| V | 100 | 88.6 | 81.1 |

EXAMPLES VI–IX

The procedure of Example I is repeated replacing the sodium cyanate with 13.0 g. (0.16 mole) of potassium cyanate. The indicated temperature is maintained throughout the reaction period.

| Example No.: | Reaction temp., °C. | Mole percent conversion of $\phi$NCO | Percent selectivity to II based on $\phi$NCO |
|---|---|---|---|
| VI | 37 | 95.3 | 82.2 |
| VII | 75 | 98.2 | 93.0 |
| VIII | 100 | 92.2 | 92.3 |
| IX | 125 | 88.9 | 90.7 |

EXAMPLE X

The process of Example I is repeated replacing the sodium cyanate with 7.83 g. (0.16 mole) of lithium cyanate. N.M.R. and infrared spectrum analysis of the isolated products indicates that the conversion of phenyl isocyanate is 90.5% and the selectivity to diphenyl isocyanurate is 79.2%.

EXAMPLE XI

A solution of 17.85 g. (0.15 mole) phenyl isocyanate in 50 ml. dry dimethylsulfioxide (DMSO) is added over one-half hour to a slurry of 6.5 g. (0.08 mole) potassium cyanate in 100 ml. DMSO according to the procedure of Example I. The temperature rises to 42° C. during the addition. After stirring at ambient temperature for an additional 80 minutes, all of the KOCN has dissolved. The products are isolated according to the procedure set forth in Example I, and from the product analysis (N.M.R. and infrared spectrum) it is determined that the conversion of phenyl isocyanate is 89.5% and the selectivity to diphenyl isocyanurate is 83.8%.

EXAMPLE XII

Following the procedure of Example I, a solution of 35.7 g. (0.3 mole) phenyl isocyanate in 100 ml. dry acetonitrile is added to 13.0 g. (0.16 mole) potassium cyanate in 200 ml. acetonitrile. There is no rise in temperature during the addition, and a small sample of the resulting reaction mixture added to water immediately forms an oil layer which subsequently forms a white solid (diphenylurea). This indicates no triphenyl isocyanurate has formed and therefore little or no phenyl isocyanate has reacted. The reaction is then heated to 75° and held at this temperature for one hour. The reaction mixture assumes a milky appearance during this period. The workup procedure is outlined by the following flow sheet. Calculations based on the products isolated show the conversion of phenyl isocyanate is 82.1% and the selectivity to diphenyl isocyanurate is 18.6%

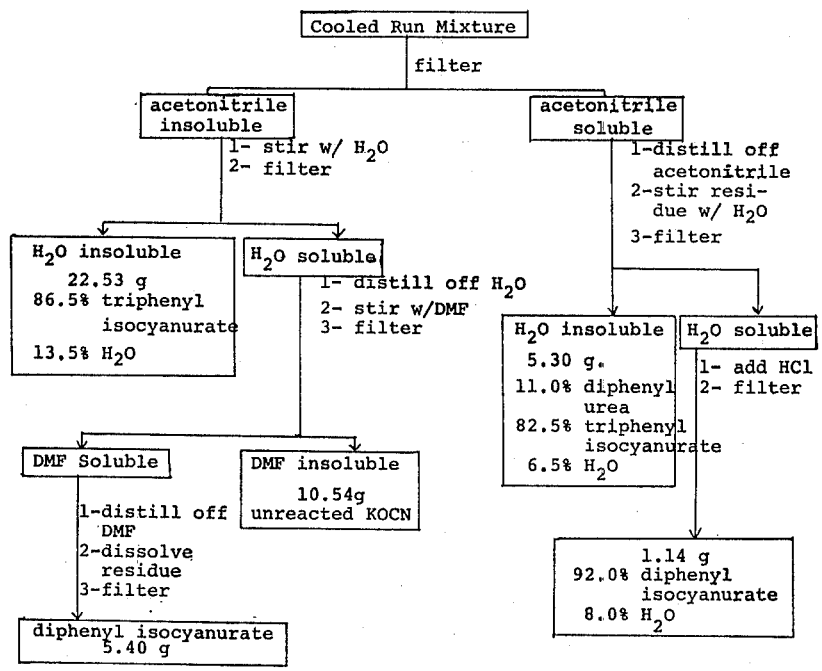

EXAMPLE XIII

According to the procedure of Example I a solution of 35.7 g. (0.30 mole) phenyl isocyanate in 100 ml. dry acetone is added to 13.0 g. (0.16 mole) potassium cyanate in 200 ml. acetone. There is no rise in temperature and a small sample of the reaction mixture added to water does not give a triphenyl isocyanurate precipitate. The reaction mixture is then held at reflux (53° C.) for one hour. The only product isolated from the reaction (same workup procedure as for Example XII) is triphenyl isocyanurate (7.4 g.).

EXAMPLES XIV–XXIII

Using the procedure of Example I, various isocyanates are reacted with potassium cyanate in DMF at 75° C.

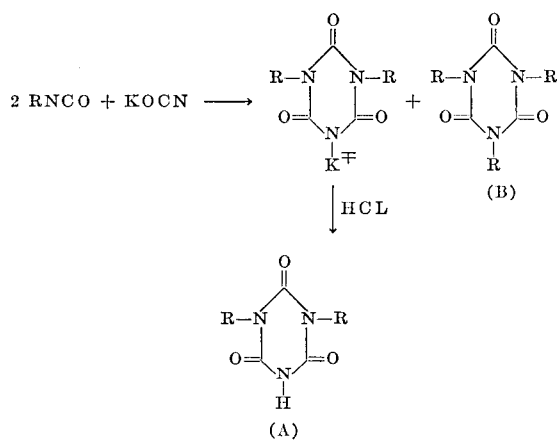

The products corresponding to A (di-substituted isocyanates) are characterized by infrared and N.M.R. spectra and elemental analyses.

| R | Mole Percent conversion of RNCO | Percent selectivity based on RNCO | Melting Point of Product A |
|---|---|---|---|
| Example No. | | | |
| XIV —CH$_2$—C$_6$H$_5$ | 84.4 | 59.5 | 179–180 |
| XV CH$_2$=CH—CH$_2$— | 76.7 | 63.9 | 147–148 |
| XVI naphthyl | 94.3 | 75.5 | 276–277 |
| XVII CH$_3$—C$_6$H$_4$— (p) | 89.7 | 92.5 | 257–258 |
| XVIII CH$_3$—C$_6$H$_4$— (o) | 91.2 | 84.1 | |
| XIX CH$_3$—C$_6$H$_4$— (m) | 87.5 | 85.7 | |
| XX CH$_3$O—C$_6$H$_4$— | 89.1 | 73.6 | 220–223 |
| XXI Cl—C$_6$H$_4$— (o) | 92.5 | 81.9 | 259–260 |
| XXII Cl—C$_6$H$_4$— (p) | 97.3 | 95.1 | 198–200 |
| XXIII NO$_2$—C$_6$H$_4$— | 84.0 | 88.9 | |

EXAMPLE XXIV

A slurry of 10.5 g. (0.16 mole) sodium cyanate in 200 ml. dry DMF is heated to 100° C, and a solution of 29.7 g. (0.30 mole) n-butyl isocyanate in 100 ml. DMF is added to it over 3 hours. The reaction is stirred at temperature for an additional 21 hours (N$_2$ atmosphere maintained throughout). The cooled reaction mixture is filtered and the DMF stripped from the filtrate leaving a waxy residue. The residue is stirred with 300 ml. distilled water causing an oil layer to form. The oil is separated, dissolved in chloroform, and dried over anhydrous magnesium sulfate. Evaporation of the chloroform leaves a residue (14.6 g.) which is identified (infrared, N.M.R.) as a mixture containing 83.6% tri-n-butyl isocyanurate and 16.4% of 1,3-di-n-butylurea. The aqueous phase remaining after seperation of the oil is acidified with concentrated HCl to give a white precipitate which is collected and dried to give 7.06 g. of a crude product, M.P. 87–90° C. One crystallization from hexane gives needles, M.P. 89–90° C. This product is identified as di-n-butyl isocyanurate via the infrared and N.M.R. spectra, elemental analysis, and neutral equivalent.

The conversion of butyl isocyanate is 60.0%.
The selectivity to di-n-butyl isocyanurate is 33.3%.

EXAMPLE XXV

To a slurry of 21.0 g. (0.32 mole) sodium cyanate in 400 ml. dry DMF is added (under an N$_2$ atmosphere) a solution of 71.4 g. (0.60 mole) phenyl isocyanate in 200 ml. DMF. The addition requires a period of 3 hours and during this time the temperature of the reaction medium rises to 35° C. The reaction is stirred at ambient temperature for an additional hour. The reaction mixture is then filtered and the DMF stripped from the filtrate leaving a solid residue. This residue is stirred with 500 ml. distilled water and the insoluble portion filtered off. The water is distilled off (in vacuo) from the aqueous filtrate leaving a light yellow solid. The solid is triturated with 50 ml. acetone, and the acetone is decanted off leaving a white solid, 47.63 g. when dry. This solid is identified (infrared, N.M.R.) as the sodium salt of diphenyl isocyanurate.

EXAMPLES XXVI–XXXII

A mixture of .025 mole of the product from Example XXV (sodium diphenyl isocyanurate); .028 mole of an alkyl halide, R—X; and 100 ml. DMF are heated at 100° C. for 5 hours under nitrogen. The DMF is distilled off (in vacuo) from the resulting reaction mixture, and the residue obtained is stirred with approximately 100 ml. distilled water. The insoluble trisubstituted isocyanurate is isolated and dried. The structure of the various purified products is established by infrared and N.M.R. spectra and by elemental analysis.

| Example No.: | R | X | M.P. of product,° | Percent yield |
|---|---|---|---|---|
| XXVI | CH$_2$=CH—CH$_2$— | Cl | 149–150 | 96 |
| XXVII | 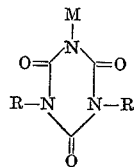—CH$_2$— | Cl | 245–246 | 100 |
| XXVIII | CH$_3$(CH$_2$)$_6$CH$_2$— | Cl | 119 | 82 |
| XXIX | CH$_3$(CH$_2$)$_6$CH$_2$— | Br | 119 | 100 |
| XXX | CH$_3$ĊHCH$_2$CH$_3$ | Cl | 141 | 31 |
| XXXI | CH$_3$ĊH(CH$_2$)$_5$CH$_3$ | Br | 98–100 | 68 |
| XXXII | CH$_3$ĊHCH$_2$CH$_3$ | Br | 141–142 | 95 |

What is claimed is:

1. A method of preparing 1,3-disubstituted isocyanuric acids comprising forming a reaction mixture consisting essentially of an organic isocyanate corresponding to the formula RNCO, wherein R is alkyl, carbocyclic aryl, carbocyclic aralkyl, or alkoxy-, nitro- or halo-substituted carbocyclic aryl or carbocyclic aralkyl, and an alkali or alkaline earth metal cyanate, the proportion of organic isocyanate to metal cyanate in the reaction mixture being about 2:1, reacting the organic isocyanate with the metal cyanate in the presence of an aprotic solvent medium at a temperature and for a time sufficient to effect formation of a metal salt of a 1,3-disubstituted isocyanuric acid corresponding to the formula

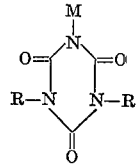

Wherein R is as defined in the formula RNCO and M is an alkali of alkaline earth metal, and converting by acidification the metal salt to the corresponding 1,3-disubstituted isocyanuric acid.

2. A method according to claim 1 wherein the organic isocyanate is selected from the group consisting of methyl isocyanate, ethyl isocyanate, propyl isocyanate, isopropyl isocyanate, butyl isocyanate, isobutyl isocyanate, amyl isocyanate, isoamyl isocyanate, cyclopentyl isocyanate, octyl isocyanate, isooctyl isocyanate, dodecyl isocyanate, tetradecyl isocyanate, hexadecyl isocyanate, octadecyl isocyanate, phenylisocyanate, tolylisocyanate, xylylisocyanate, p-nitrophenylisocyanate, p-chlorophenylisocyanate, p-methoxyphenylisocyanate, p-ethoxyphenylisocyanate, diphenylisocyanate, naphthylisocyanate, 4-nitronaphthylisocyanate, benzylisocyanate, p-nitrobenzylisocyanate, p-nitrobenzylisocyanate, p-methoxybenzylisocyanate, p-ethoxybenzylisocyanate, p-chlorobenzylisocyanate, naphthobenzylisocyanate, 4-nitronaphthobenzylisocyanate, and 4-methoxynaphthobenzylisocyanate.

3. A method according to claim 1 wherein the aprotic solvent is characterized in that it is a liquid under the conditions of the reaction, it has a relatively high dielectric constant, it is dipolar in that one part of the molecule has a more positive electrical charge relative to the other parts of the molecule thereby causing the molecule to act as a dipole, it is sufficiently inert so as not to enter into deleterious side reactions to any appreciable extent under the reaction conditions, and it does not possess hydrogen atoms capable of hydrogen bonding with or transferring to anions in solution in the reaction mixture.

4. A method according to claim 1 wherein the aprotic solvent is a member of the group consisting of N-alkyl pyrrolidones, dialkylamides, alkylacetamides, alkylphosphoramides, arylphosphoramides, alkylureas, alkylsulfoxides, arylsulfones, and nitriles, and mixtures thereof.

5. A method according to claim 1 wherein the reaction is carried out at a temperature of from about 0° to about 250° C.

6. A method according to claim 1, wherein the aprotic solvent is dimethylformamide and the temperature employed is from about 10° to about 100° C.

7. A method according to claim 1, wherein the reaction is carried out under pressure in the range of about 1 to about 30 atmospheres.

8. A method of preparing a metal salt of a 1,3-disubstituted isocyanuric acid comprising forming a reaction mixture consisting essentially of an organic isocyanate corresponding to the formula RNCO, where R is alkyl, carbocyclic aryl, carbocyclic aralkyl, or alkoxy-, nitro- or halo-substituted carbocyclic aryl or carbocyclic aralkyl, and an alkali or alkaline earth metal cyanate, the proportion of organic isocyanate to metal cyanate in the reaction mixture being about 2:1, and reacting the organic isocyanate with the metal cyanate in the presence of an aprotic solvent medium at a temperature and for a time sufficient to effect formation of a metal salt of a 1,3-disubstituted isocyanuric acid corresponding to the formula wherein R is as defined in the formula RNCO and M is an alkali or alkaline earth metal.

References Cited

UNITED STATES PATENTS

| | | | |
|---|---|---|---|
| 2,536,849 | 1/1951 | Kaiser et al. | 260—248 |
| 2,866,801 | 12/1958 | Himel et al. | 260—248X |
| 2,866,802 | 12/1958 | Graham | 260—248X |
| 2,993,870 | 7/1961 | Burkus | 260—248X |
| 3,108,100 | 10/1963 | Tate et al. | 260—248 |
| 3,211,704 | 10/1965 | Gilman et al. | 260—248X |
| 3,249,607 | 5/1966 | Taub et al. | 260—248 |
| 3,259,626 | 7/1966 | Muller et al. | 260—248 |
| 2,683,144 | 7/1954 | Balon et al. | 260—248X |
| 2,977,360 | 3/1961 | Dixon | 260—248 |
| 3,108,100 | 10/1963 | Tate et al. | 260—248 |

OTHER REFERENCES

Smolin et al.: "s-Triazines and Derivatives," Interscience Pub. Inc., New York (1959), p. 25.

NORMA S. MILESTONE, Primary Examiner

J. M. FORD, Assistant Examiner

U.S. Cl. X.R.

260—999, 77.5